(12) United States Patent
Cirioli et al.

(10) Patent No.: US 11,001,391 B2
(45) Date of Patent: May 11, 2021

(54) AUTOMATIC ADJUSTING FUEL BOOST PUMP

(71) Applicant: Sikorsky Aircraft Corporation, Stratford, CT (US)

(72) Inventors: Adriano Cirioli, North Haven, CT (US); Daniel John Shields, Derby, CT (US); Alex Meyer, Jupiter, FL (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 846 days.

(21) Appl. No.: 15/560,421

(22) PCT Filed: Mar. 24, 2016

(86) PCT No.: PCT/US2016/023975
§ 371 (c)(1),
(2) Date: Sep. 21, 2017

(87) PCT Pub. No.: WO2016/154414
PCT Pub. Date: Sep. 29, 2016

(65) Prior Publication Data
US 2018/0065756 A1   Mar. 8, 2018

Related U.S. Application Data

(60) Provisional application No. 62/138,055, filed on Mar. 25, 2015.

(51) Int. Cl.
*B64D 37/10* (2006.01)
*F02M 37/18* (2006.01)
(Continued)

(52) U.S. Cl.
CPC ............. *B64D 37/10* (2013.01); *B64D 37/00* (2013.01); *F02C 7/236* (2013.01); *F02M 37/10* (2013.01);
(Continued)

(58) Field of Classification Search
CPC ........... B64D 37/10; B64D 37/00; F02C 9/26; F02M 37/10; F02M 37/103; F02M 37/18
See application file for complete search history.

(56) References Cited

U.S. PATENT DOCUMENTS

| 4,324,569 A | 4/1982 | Klimczak |
| 5,118,258 A | 6/1992 | Martin |

(Continued)

FOREIGN PATENT DOCUMENTS

| EP | 2236794 A1 | 10/2010 |
| GB | 2501289 A | 10/2013 |
| WO | 2014027250 A2 | 2/2014 |

OTHER PUBLICATIONS

PCT ISR Written Opinion; International Application No. PCT/US2016/023975; International Filing Date: Mar. 24, 2016; dated Jun. 10, 2016, pp. 1-5.

(Continued)

*Primary Examiner* — Philip J Bonzell
(74) *Attorney, Agent, or Firm* — Foley & Lardner LLP

(57) ABSTRACT

A fuel supply system for an aircraft includes a fuel tank configured to supply fuel to an engine of an aircraft, a boost pump in operational communication with the fuel tank, wherein the boost pump is configured to control at least one of a fuel level and a fuel pressure in the fuel tank, and an electronic controller in communication with the boost pump and configured to control the boost pump. The electronic controller is configured to receive received information including (i) fuel information, (ii) flight information, and (iii) aircraft information, and configured to control the boost pump based on the received information.

18 Claims, 3 Drawing Sheets

(51) Int. Cl.
  *F02C 7/236* (2006.01)
  *B64D 37/00* (2006.01)
  *F02M 37/10* (2006.01)
  *F04B 49/06* (2006.01)
  *F02C 9/26* (2006.01)

(52) U.S. Cl.
  CPC .......... *F02M 37/103* (2013.01); *F02M 37/18* (2013.01); *F02C 9/26* (2013.01); *F02M 37/106* (2013.01); *F04B 49/065* (2013.01); *F04B 2207/00* (2013.01); *F05D 2270/301* (2013.01); *Y02T 50/40* (2013.01)

(56) References Cited

U.S. PATENT DOCUMENTS

| | | | |
|---|---|---|---|
| 6,732,521 | B2 | 5/2004 | Otake |
| 8,226,040 | B2* | 7/2012 | Neto ................ G01M 1/127 |
| 8,572,974 | B2 | 11/2013 | Veilleux, Jr. |
| 9,556,838 | B2* | 1/2017 | Wood ................ F02C 7/236 |
| 2004/0117102 | A1 | 6/2004 | Weir et al. |
| 2004/0154595 | A1 | 8/2004 | Wheeler |
| 2008/0173763 | A1 | 7/2008 | Morgia et al. |
| 2010/0044515 | A1 | 2/2010 | Neto |
| 2011/0139123 | A1 | 6/2011 | Brocard et al. |
| 2012/0111417 | A1 | 5/2012 | Smith et al. |
| 2012/0173078 | A1 | 7/2012 | Everett et al. |
| 2013/0213044 | A1 | 8/2013 | Lollini et al. |
| 2015/0114477 | A1* | 4/2015 | Wood ................ F02C 9/28 137/12 |

OTHER PUBLICATIONS

PCT Notification of Transmittal of the International Search Report; International Application No. PCT/US2016/023975; International Filing Date: Mar. 24, 2016; dated Jun. 10, 2016, pp. 1-11.
European Search Report for European Application No. 16769674.9; Date of Completion: Sep. 10; 2018; 10 Pages.

* cited by examiner

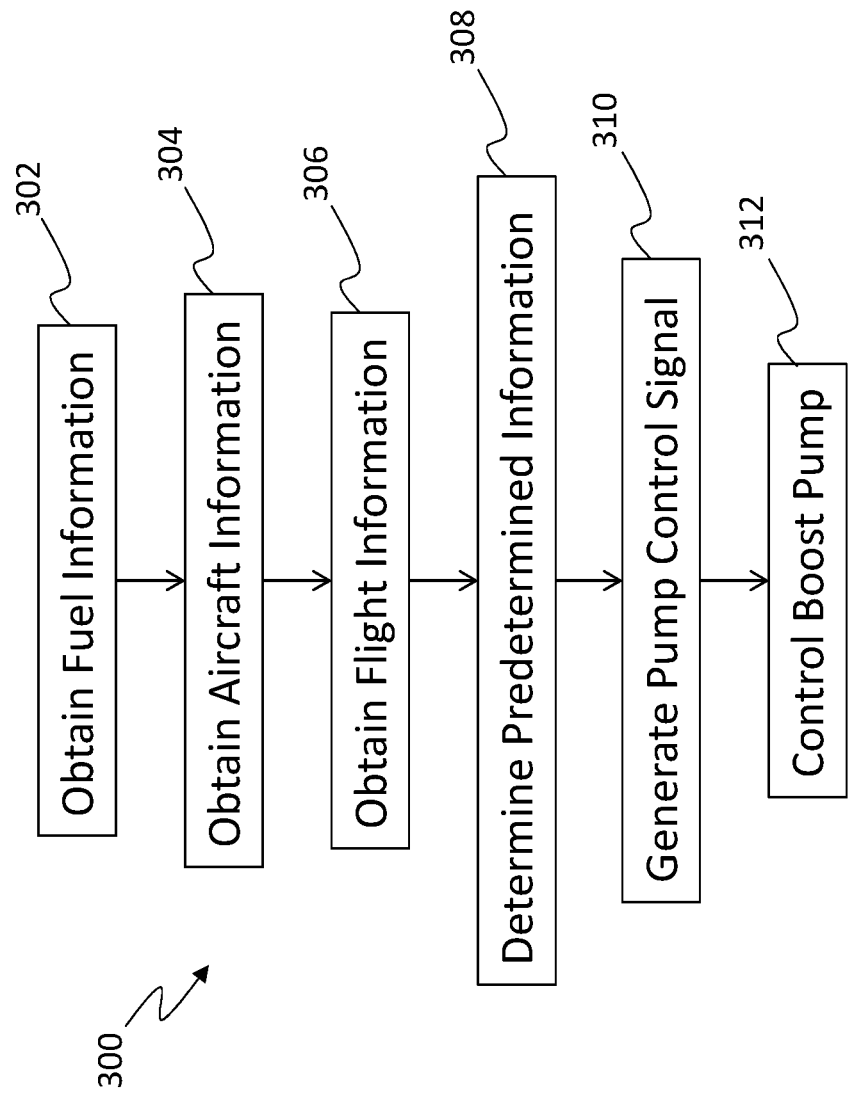

AUTOMATIC ADJUSTING FUEL BOOST PUMP

CROSS REFERENCE TO RELATED APPLICATIONS

This application is a National Stage application of PCT/US2016/023975, filed Mar. 24, 2016, which claims the benefit of U.S. Provisional Patent Application No. 62/138,055, filed Mar. 25, 2015, both of which are incorporated by reference in their entirety herein.

BACKGROUND OF THE INVENTION

Embodiments of the invention are directed to fuel boost pumps and more particularly to fuel boost pumps that automatically compensate for maneuvers of an aircraft.

In a typical aircraft layout, such as a helicopter, a fuel tank is located in a lower portion of the aircraft and the engine driving a rotor of the aircraft is located in an upper portion of the aircraft. During operation, fuel is drawn through a fuel pipe from the fuel tank by means of a suction pump located adjacent the main engine. As aircraft increase in size, the fuel head between the fuel pump and the tank increases, resulting in an increase in the suction required to supply fuel to the engine.

Furthermore, the maneuvers that the helicopter can undertake may be extreme, which may result in a risk that a combination of the head of fuel between the pump and the tank, and the high acceleration experienced during extreme maneuvers mean that the absolute pressure at the inlet to the suction pump may approach or fall below the true vapor pressure of the fuel. This can cause fuel vapor to be evolved and can cause dissolved air to come out of solution. If the proportion of gas and/or vapor to liquid fuel at the inlet of the pump exceeds the pump capability, the fuel flow to the engine may be interrupted or significantly restricted, thereby resulting in loss of engine power or an engine failure.

BRIEF DESCRIPTION OF THE INVENTION

According to one embodiment a fuel supply system for an aircraft is provided. The system includes a fuel tank configured to supply fuel to an engine of an aircraft, a boost pump in operational communication with the fuel tank, wherein the boost pump is configured to control at least one of a fuel level and a fuel pressure in the fuel tank, and an electronic controller in communication with the boost pump and configured to control the boost pump. The electronic controller is configured to receive received information including (i) fuel information, (ii) flight information, and (iii) aircraft information, and configured to control the boost pump based on the received information.

In addition to one or more of the features described above, or as an alternative, further embodiments may include the received information further includes predetermined information that is stored in the electronic controller.

In addition to one or more of the features described above, or as an alternative, further embodiments may include the predetermined information comprises a look-up table includes at least one of fuel vapor pressures, fuel system installation pressure drop characteristics as a function of fuel flowrate, engine installed pump minimum requirement for both true vapor pressure and vapor-to-liquid characteristics.

In addition to one or more of the features described above, or as an alternative, further embodiments may include the fuel information includes at least one of fuel height, fuel density, fuel pressure, and fuel temperature.

In addition to one or more of the features described above, or as an alternative, further embodiments may include the flight information includes acceleration due to pilot induced aircraft maneuvers communicated via at least one of rotational variable differential transformer, and rotary or linear potentiometer that defines collective position of G-load anticipation.

In addition to one or more of the features described above, or as an alternative, further embodiments may include the aircraft information includes at least one of altitude, ambient air temperature, and fuel type.

In addition to one or more of the features described above, or as an alternative, further embodiments may include a fuel conditioning unit, wherein the fuel conditioning unit is configure to generate the fuel information.

In addition to one or more of the features described above, or as an alternative, further embodiments may include the aircraft is a helicopter.

According to another embodiment, a method of automatically controlling a boost pump of an aircraft is provided. The method includes receiving fuel information at a controller; receiving flight information at the controller; receiving aircraft information at the controller; calculating a required minimum pressure at an engine fuel inlet interface; generating a pump control signal based on the fuel information, the flight information, the requirement minimum pressure, and the aircraft information; and operating a boost pump in response to the pump control signal.

In addition to one or more of the features described above, or as an alternative, further embodiments may include receiving predetermined information at the controller.

In addition to one or more of the features described above, or as an alternative, further embodiments may include the predetermined information comprises at least one of information from a look-up table of fuel vapor pressures, fuel system installation pressure drop characteristics as a function of fuel flowrate, engine installed pump minimum input requirements for both true vapor pressure and vapor-to-liquid characteristics.

In addition to one or more of the features described above, or as an alternative, further embodiments may include the fuel information includes at least one of fuel height, fuel density, fuel pressure, and fuel temperature.

In addition to one or more of the features described above, or as an alternative, further embodiments may include the flight information includes acceleration due to pilot induced aircraft maneuvers defined by at least one of rotational variable differential transformer information and rotary or linear potentiometer information.

In addition to one or more of the features described above, or as an alternative, further embodiments may include the aircraft information includes at least one of altitude, ambient air temperature, and fuel type.

In addition to one or more of the features described above, or as an alternative, further embodiments may include sending feedback to an aircraft management system that a pump speed has changed.

In addition to one or more of the features described above, or as an alternative, further embodiments may include the aircraft is a helicopter.

Technical effects of embodiments of the invention include controller configured to automatically provide adequate fuel and fuel pressure during maneuvering of an aircraft. Further technical effects include providing an electronic control system for fuel supply during maneuvering. Further technical effects include automatic and continuous monitoring of the health status of a fuel boost pump. Further technical effects include ground testing of the system via a power-up built-in status check using aircraft management system software to provide a simulated collective input and check and pump operation, such as pump speed monitoring and/or downstream pressure to ensure in-flight operation.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

FIG. 3 is a flow chart of a process in accordance with an exemplary embodiment of the invention.

DETAILED DESCRIPTION OF THE INVENTION

Figure 1:
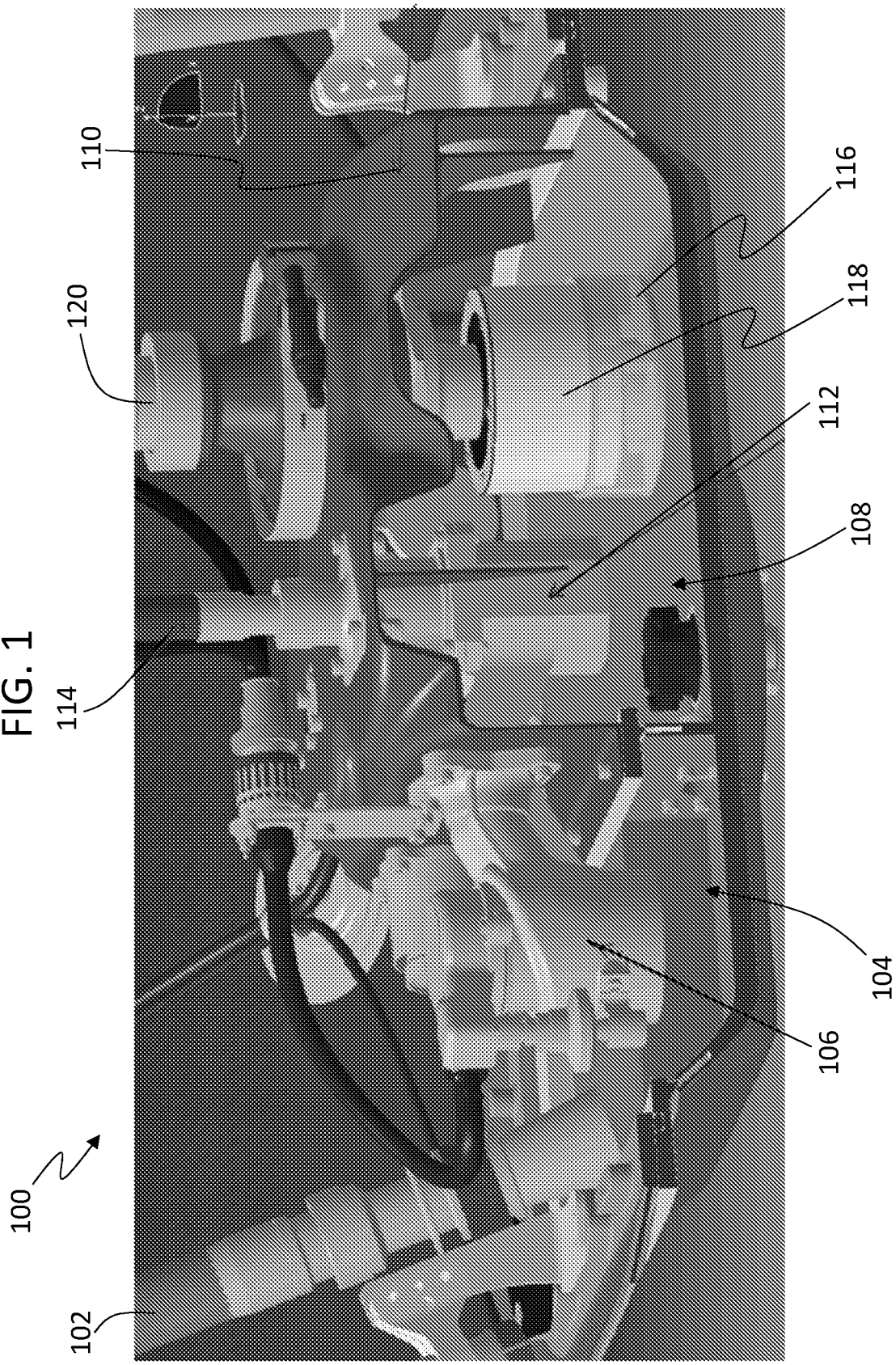
FIG. 1 is a cut-away view of a fuel supply system.

FIG. 1 illustrates a fuel supply system 100. Fuel supply system 100 includes a fuel input line 102 that is configured to communicate fuel into the fuel supply system 100. The input line 102 is in fluid communication with a first fuel chamber 104. Operationally connected and/or located within the first fuel chamber 104 is a boost pump 106 that is configured to pump fuel from the first fuel chamber 104 into a second fuel chamber 108. The second fuel chamber 108 is housed within a maneuvering can 110. The boost pump 106 is configured to boost fuel supply to the second fuel chamber 108, thus adjusting the fuel pressure within the maneuvering can 110. The adjustment is made to accommodate flight maneuvers of an aircraft, such as, for example, changes in G-load and/or altitude.

Accordingly, a pressure regulation valve 112 is configured to monitor the pressure of the fuel within the second fuel chamber 108. The pressure regulation valve controls the fluid flow from the first fuel chamber 104 to the second fuel chamber 108 in connection with the boost pump 106. Thus, the pressure regulation valve 112 impacts or controls the amount of fluid that may be provided by the boost pump 106. In traditional configurations, such as shown in FIG. 1, a stand pipe 114 is provided. The stand pipe 114 is in mechanical and/or operable communication with the pressure regulation valve 112.

The stand pipe 114 imparts a pressure differential on the pressure regulation valve 112, thus controlling the pressure regulation valve 112 and the amount of fluid that is transferred from the first fuel chamber 104 to the second chamber 108. The stand pipe 114 is used to calculate or determine fuel height within the second fuel chamber 108. Based on this, the amount of fuel pumped or input into the second fuel chamber 108 from the first fuel chamber 104 may be adjusted to change the fuel level or pressure within the second fuel chamber 108 to compensate for fuel consumption during maneuvers of an aircraft.

The fuel within the second fuel chamber 108 may then flow or be conveyed through a filter 116 and into a fuel pump 118 that pumps fuel to an engine (not shown). The fuel is pumped by the pump 118 and out of the maneuver can 110 through outlet 120 to the engine.

As shown in FIG. 1, the control for fuel height and fuel pressure in the second fuel chamber 108 is the stand pipe 114. The stand pipe 114 is a mechanical or analog mechanism that relies on the fuel pressure within the second fuel chamber 108. Such a system is not able to anticipate or compensate for other factors related to the flight and maneuvering of an aircraft. That is, the system shown in FIG. 1 can only react to the maneuvering of the aircraft and then compensate after the fact.

Figure 2:
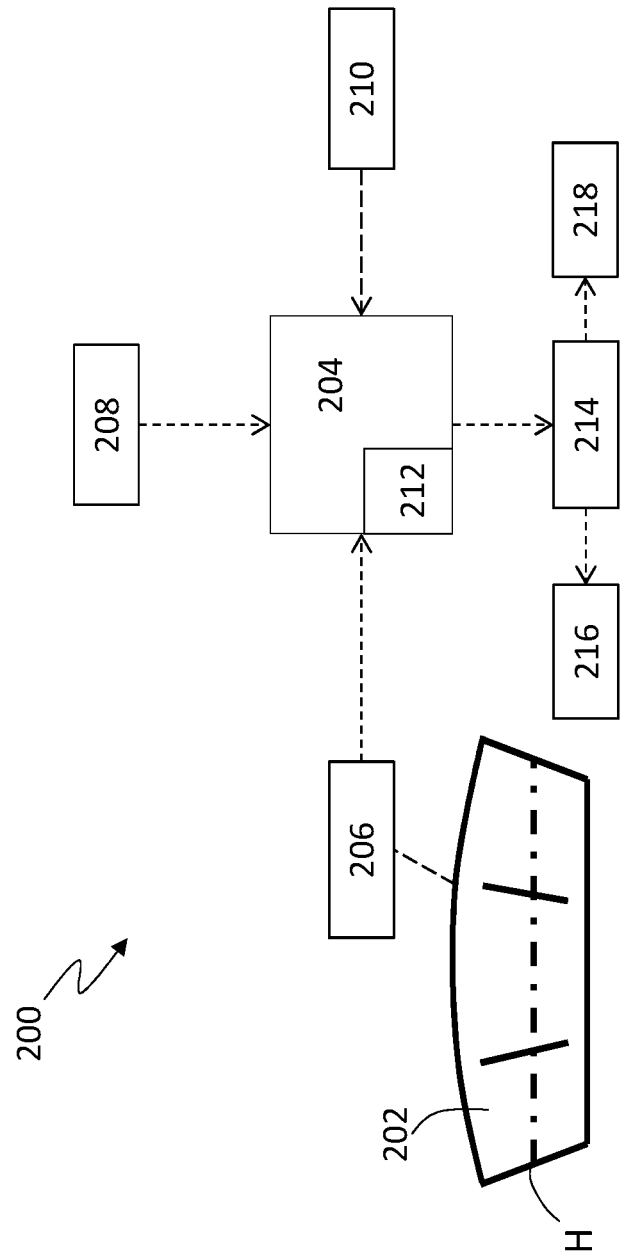
FIG. 2 is a schematic view of an exemplary fuel supply system in accordance with the invention.

Turning now to FIG. 2, a schematic of a fuel control system 200 in accordance with an exemplary embodiment of the invention is shown. System 200 includes a fuel tank 202 that may be configured and operate similar to the fuel supply system 100 of FIG. 1. However, rather than a mechanical/analog control on the boost pump (in the form of the stand pipe 114 and pressure regulation valve 112) the system 200 includes a digital controller 204 that is configured to operationally control a boost pump operationally connected to or within the fuel tank 202. In accordance with embodiments of the invention, the controller 204 receives digital information or data from various components throughout an aircraft and then electronically controls a boost pump in order to provide or supply adequate fuel and fuel pressure during maneuvering of an aircraft.

Various embodiments of the invention eliminate the stand pipe and other aspects of a mechanical or analog system as described above. Rather, a digital controller 204 is configured to receive various inputs and then electrically or electronically control a fuel pump. For example, as shown in FIG. 2, a fuel conditioning unit 206 is operationally connected to the fuel tank 202. The fuel conditioning unit 206 is configured to measure or determine various components, features, and/or characteristics of the fuel within the fuel tank 202, hereinafter "fuel information." The fuel information may include a fuel height H, i.e., the height of the fuel within the fuel tank 202, a fuel density $\rho$, a fuel temperature $T_F$, etc., from this, for example, a pressure measurement $\Delta P$ may then be calculated by the controller 204. The fuel conditioning unit 206 can then output, in digital format, the fuel information to the controller 204.

Because the system is digital or electrical, the inputs to the controller 204 may include inputs that are in addition to inputs that are specific to the fuel tank 202. That is, unlike the prior system that relied on the stand pipe and pressure valve (in the fuel tank) to control the fuel boost pump, embodiments of the invention can incorporate additional information to enable anticipation and automatic adjustment of fuel supply and pressure, i.e., control the boost pump automatically and in anticipation or contemporarily with aircraft maneuvers. For example, additional information may come from other sources throughout an aircraft, thus enabling a more efficient fuel control system for the aircraft.

As shown in FIG. 2, the controller 204 may receive inputs of aircraft information including altitude ALT, external or outside or ambient temperature $T_A$, fuel type $F_T$, etc. The aircraft information 208 may be supplied from various sensors distributed throughout the aircraft. Aircraft information 208 may be a central processor, memory, relay, etc. that collects information from various sensors to then convey the information to the controller 204. In alternative embodiments, aircraft information 208 in FIG. 2 schematically represents a plurality of sensors which convey collected or detected information to the controller 204 directly.

The controller 204 may also receive information that is related to the control of the aircraft as input by a pilot or other user. Such information is referred to herein as "flight information" 210 and may originate, at least in part, in the cockpit of the aircraft. The flight information 210 may include acceleration G of the aircraft due to pilot induced aircraft maneuvering and information from a rotational variable differential transformer ("RVDT"). The RVDT is a device that converts kinematic motion of the pilot control levers into electrical voltages that may be supplied to the controller 204. The RVDT output may use a pilot collective "pull" as "anticipation" to the controller 204 to adjust a fuel discharge pressure to ensure enough boost pressure is supplied during an aircraft maneuver, such as a 60 degree turn (approximately 2-G load). The RVDT supplies digital information. Alternatively or in combination with an RVDT, collective position and/or G-load anticipation may be provided by a rotary or linear potentiometer, and as such may be analog information. Additionally, for example, cyclic rate sensors and/or airspeed may be used as inputs to predict G-loading of an aircraft.

The controller 204 may then increase the fuel boost pump speed to ensure the proper fuel pressure and flow is available to an engine fuel control inlet. Thus the flight information 210 is active information, that is, information that is related to the actions of a user of the aircraft, such as the pilot.

The controller 204 may also include a memory or other device for storing predetermined information 212. The memory may include a look-up table that may be referenced to obtain the predetermined information 212. For example, the memory may include at least one of a fuel vapor pressure $P_v$ table, fuel system installation pressure drop characteristics as a function of fuel flowrate, engine installed pump minimum input requirements for both true vapor pressure and vapor-to-liquid characteristics. In some embodiments, a fuel vapor pressure table may be used to output a fuel vapor pressure which is based, in some embodiments, upon outside air temperature $T_A$, fuel type $F_T$, and altitude ALT (from the aircraft input 208), readings from an engine flow fuel meter, and the fuel temperature $T_F$ (from the fuel conditioning unit 206). The controller 204 further includes processors and/or other data manipulation type devices. For example, with the inputs described above, a processor of the controller 204 may perform an operation wherein $P_v=f(T_A, ALT, T_F, F_T)$, to obtain the fuel vapor pressure.

The controller 204 may also be configured to calculate a required minimum pressure at an engine fuel inlet interface. That is, the controller 204 may calculate a desired or target fuel pressure to maintain within the system such that sufficient fuel is supplied for an aircraft maneuver. The required minimum pressure may be maintained by operation and control supplied by the controller 204.

Furthermore, the controller 204, taking the fuel height information obtained from fuel conditioning unit 206 and the flow and system flow characteristics (flow vs. pressure drop) from the predetermined information 212, can determine the overall fuel pressure drop based on acceleration or G-load losses. This may be based on available fuel height H in the fuel tank 202 sent to the fuel conditioning unit 206 plus fuel system dynamic losses (flow losses determined from predetermined information 212 or determined by the controller 202) to determine the pressure at an engine fuel control inlet. By knowing the engine boost pump vapor-to-liquid critical pump characteristics, which may be contained in the predetermined information 212, the controller 204 can ensure that the pressure at the engine fuel control inlet satisfies the engine installation manual requirements for the engine throughout a flight envelope.

Thus, the controller 204 may receive inputs from multiple sources, including, as shown in FIG. 2, a fuel conditioning unit 206, aircraft information 208, flight information 210, and predetermined information 212. From receiving and processing the inputs, the controller 204 may then control the boost pump 216 of the aircraft by outputting a control signal 214. The control signal 214 is sent to the boost pump 216 to control the speed or other characteristic of the boost pump 216 in order to provide efficient fuel supply and pressure during operation of the aircraft, and in response to changes in the information obtained by the controller 204.

The output 214 may also be sent to the cockpit 218 so that an operator can monitor the status of the control pump 216, i.e., monitor and/or confirm pump operation. Thus, the output 214 may be part of a built-in test or system that continuously monitors the status of the boost pump 216 during operation thereof. Advantageously, output 214 can enable an operator, such as a pilot, to immediately determine that a fault is present in the fuel supply system 200.

Thus, embodiments of the invention enable the contribution of flight information 210, aircraft inputs 208, predetermined information 212, and fuel inputs 206 from fuel conditioning unit to determine the appropriate speed of a boost pump to most accurately and efficiently provide the appropriate amount of fuel and fuel pressure during changes in the flight of the aircraft, such as G-load and altitude.

Turning now to FIG. 3, a process 300 in accordance with an exemplary embodiment of the invention is shown. The process 300 may be performed within a system such as shown in FIG. 2, and specifically may be performed by a controller on an aircraft. The controller may be a dedicated or independent fuel supply controller or may be part of the electrical and/or control systems of the aircraft. Inputs are sent to or obtained by the controller. The communication of the inputs may be by means of wired or wireless transmission, or a combination thereof. Further, as noted above, the controller may be configured as or include a processor and/or memory.

In the process 300, at step 302, a controller obtains fuel information regarding fuel in a fuel tank of an aircraft. As noted above, the fuel information may include a height H of the fuel within the fuel tank, a fuel density $\rho$, a pressure measurement $\Delta P$, a fuel temperature $T_F$, etc. In some embodiments, step 302 may include calculating the pressure measurement $\Delta P$ from other information. For example, the pressure measurement $\Delta P$ may be calculated by multiplying fuel density $\rho$, fuel height H, and the acceleration G due to pilot induced aircraft control or maneuvering. That is, a processor or other unit may calculate $\Delta P=\rho*G*H$.

At step 304, the controller obtains aircraft information. The aircraft information, as discussed above, includes, for example, altitude ALT, ambient air temperature $T_A$, and fuel type $F_T$. The aircraft information may be conveyed directed from sensors throughout the aircraft to the controller, or may be collected at a central device and transmitted or sent to the controller.

At step 306, the controller obtains flight information. The flight information includes, for example, acceleration G due to pilot induced aircraft maneuvers, and RVDT (rotational variable differential transformer) information. As discussed above, the RVDT information is generated from kinematic motion of the pilot control levers (e.g., collective anticipation). The flight information is directly related to operator controller characteristics of the aircraft and is communicated to the controller.

At step 308, the controller extracts or determines predetermined information, such as the fuel vapor pressure. The predetermined information may be part of a look-up table stored in the controller or stored on any other memory or similar device on the aircraft. As noted above, the fuel vapor pressure is a function of the ambient air temperature $T_A$, the altitude ALT, the fuel temperature $T_F$, and the fuel type $F_T$. As such, the predetermined information is in part dependent on information obtained from other sources on the aircraft and is a function of characteristics of the flight of an aircraft. Further, other information may be obtained from the predetermined information, such as engine boost pump vapor-to-liquid critical pump characteristics, fuel system installation pressure drop characteristics as a function of fuel flowrate, engine installed pump minimum input requirements for both true vapor pressure and vapor-to-liquid characteristics.

It will be noted that steps 302-308 may be performed continuously and/or simultaneously. For example, step 302 may require information obtained during step 306, and thus step 306 may need to be performed before step 302, or at least one cycle of step 306 must be performed prior to a current cycle of step 302. Thus, even if performed sequentially, the sequence of events or steps shown in FIG. 3 are merely exemplary and the order of steps is not limited to that shown. Further, the steps 302-308 may be performed continuously such that information obtained from each of the steps are consistently available.

After the controller has obtained all pertinent information from the various inputs, and determined, calculated, or measured any additional information that may be required, the controller can generate a pump control signal at step 310. The pump control signal generated at step 310 may be an electrical signal that may be transmitted or sent to a boost pump to control, at step 312, the fuel pressure and fuel supplied by the boost pump.

Further, although not shown, it will be appreciated that because the pump control signal generated at step 310 is an electrical or digital signal, the pump control signal may be sent to the cockpit or other processor or device that can provide an output or display indicating the operation of the boost pump. For example, the pump control signal may be used as a continuous built-in test that is provided to send a status of the boost pump operation to the cockpit. Similarly, feedback may be transmitted or conveyed to an aircraft management system that the pump speed or pump operation has been altered or changed.

Advantageously, embodiments of the invention provide a fuel supply system that can automatically compensate for maneuvers of an aircraft. Further, advantageously, embodiments of the invention enable a system that can compensate for changes in flight information, fuel information, aircraft information, and predetermined information when controlling a fuel boost pump. Thus, during maneuvers of an aircraft, the fuel supply and fuel pressure may be maintained at appropriate levels for the specific maneuvers of the aircraft.

Further, advantageously, embodiments of the invention provide a digital control system that may be continuously monitored, even during flight of an aircraft. Thus, a pilot may obtain real-time and/or continuous feedback and information regarding the fuel supply boost pump. That is, in contrast to prior configurations, a real-time monitoring system is provided. In prior configurations, the boost pump performance could only be determined after a flight was completed and the aircraft was on the ground. However, with embodiments of the invention, this is no longer the case, but rather a pilot or other operator may be able to determine the current status of the fuel boost pump during flight and in response to specific maneuvering of the aircraft.

Furthermore, advantageously, embodiments of the invention enable the removal of the stand pipe from the maneuvering can, thus simplifying system configurations and reducing the weight of the system in an aircraft. Moreover, by removal of the stand pipe, analog or mechanical systems may be eliminated, thus simplifying the system, and eliminating additional components that may fail.

Furthermore, advantageously, in addition to providing in-air monitoring, embodiments of the invention enable on-ground testing of the system. That is, flight maneuvers may be simulated to test the system. Moreover, because of the continuous monitoring, even when the aircraft is on the ground, but operational, an operator may be able to monitor or determine the status of the fuel supply system easily.

While the invention has been described in detail in connection with only a limited number of embodiments, it should be readily understood that the invention is not limited to such disclosed embodiments. Rather, the invention can be modified to incorporate any number of variations, alterations, substitutions, combination, sub-combination, or equivalent arrangements not heretofore described, but which are commensurate with the spirit and scope of the invention. Additionally, while various embodiments of the invention have been described, it is to be understood that aspects of the invention may include only some of the described embodiments.

For example, although described herein as part of a helicopter, in the exemplary embodiments, those of skill in the art will appreciate that the fuel supply system described herein may be used for any type of aircraft: fixed wing, rotary wing, etc. Further, although described herein a controller that is separate from the fuel tank, the controller can be located anywhere in the aircraft. Moreover, the controller may be an independent hardware and/or software device or may be incorporated into other control and/or electrical systems of the aircraft.

Accordingly, the invention is not to be seen as limited by the foregoing description, but is only limited by the scope of the appended claims.

What is claimed is:

1. A fuel supply system for an aircraft, the system comprising:
   a fuel tank configured to supply fuel to an engine of an aircraft;
   a boost pump in operational communication with the fuel tank, wherein the boost pump is configured to control at least one of a fuel level or a fuel pressure in the fuel tank; and
   an electronic controller in communication with the boost pump and configured to control the boost pump, the electronic controller being configured to receive received information including (i) fuel information, (ii) flight information, and (iii) aircraft information, and to use an anticipated G-load to control the boost pump based on the received information.

2. The fuel supply system of claim 1, wherein the fuel information includes at least one of fuel height, fuel density, fuel pressure, or fuel temperature.

3. The fuel supply system of claim 1, wherein the flight information includes acceleration due to pilot induced aircraft maneuvers communicated via at least one of rotational variable differential transformer, or a rotary or linear potentiometer that defines collective position of G-load anticipation.

4. The fuel supply system of claim 1, wherein the aircraft information includes at least one of altitude, ambient air temperature, or fuel type.

5. The fuel supply system of claim 1, further comprising a fuel conditioning unit, wherein the fuel conditioning unit is configure to generate the fuel information.

6. The fuel supply system of claim 1, wherein the aircraft is a helicopter.

7. The fuel supply system of claim 1, wherein the received information further includes predetermined information that is stored in the electronic controller.

8. The fuel supply system of claim 7, wherein the predetermined information comprises a look-up table, which includes at least one of fuel vapor pressures, fuel system installation pressure drop characteristics as a function of fuel flowrate, engine installed pump minimum requirement for both true vapor pressure or vapor-to-liquid characteristics.

9. A method of automatically controlling a boost pump of an aircraft, the method comprising:
 receiving fuel information at a controller;
 receiving flight information at the controller;
 receiving aircraft information at the controller;
 calculating a required minimum pressure at an engine fuel inlet interface;
 generating a pump control signal based on the fuel information, the flight information, the requirement minimum pressure, and the aircraft information; and
 operating a boost pump in response to the pump control signal, using an anticipated G-load.

10. The method of claim 9, wherein the fuel information includes at least one of fuel height, fuel density, fuel pressure, or fuel temperature.

11. The method of claim 9, wherein the flight information includes acceleration due to pilot induced aircraft maneuvers defined by at least one of rotational variable differential transformer information or rotary or linear potentiometer information.

12. The method of claim 9, wherein the aircraft information includes at least one of altitude, ambient air temperature, or fuel type.

13. The method of claim 9, further comprising sending feedback to an aircraft management system that a pump speed has changed.

14. The method of claim 9, wherein the aircraft is a helicopter.

15. The method of claim 9, wherein the anticipated G-load is determined based on at least one of an airspeed or an input from at least one cyclic rate sensor.

16. The method of claim 9, further comprising sending, by the controller, the pump control signal to an operator for monitoring a status of the boost pump.

17. The method of claim 9, further comprising receiving predetermined information at the controller.

18. The method of claim 17, wherein the predetermined information comprises at least one of information from a look-up table of fuel vapor pressures, fuel system installation pressure drop characteristics as a function of fuel flowrate, engine installed pump minimum input requirements for both true vapor pressure or vapor- to- liquid characteristics.

* * * * *